(12) United States Patent
Sugegaya et al.

(10) Patent No.: US 12,437,284 B2
(45) Date of Patent: Oct. 7, 2025

(54) DETECTION SYSTEM, DETECTION METHOD, AND STORAGE MEDIUM

(71) Applicant: NEC Corporation, Tokyo (JP)

(72) Inventors: Hiroki Sugegaya, Tokyo (JP); Shunsuke Tsuda, Tokyo (JP); Ning Li, Tokyo (JP); Yuki Tsuruoka, Tokyo (JP); Shuta Okada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 18/267,634

(22) PCT Filed: Dec. 20, 2021

(86) PCT No.: PCT/JP2021/046952
§ 371 (c)(1),
(2) Date: Jun. 15, 2023

(87) PCT Pub. No.: WO2022/209055
PCT Pub. Date: Oct. 6, 2022

(65) Prior Publication Data
US 2024/0054470 A1   Feb. 15, 2024

(30) Foreign Application Priority Data
Mar. 30, 2021  (JP) ................. 2021-056682

(51) Int. Cl.
*G06Q 20/20* (2012.01)
*G06T 7/20* (2017.01)
*G06V 40/20* (2022.01)

(52) U.S. Cl.
CPC ............ *G06Q 20/208* (2013.01); *G06T 7/20* (2013.01); *G06V 40/28* (2022.01); *G06T 2207/30242* (2013.01)

(58) Field of Classification Search
CPC ...... G06Q 20/208; G06Q 20/18; G06Q 20/20; G06Q 30/06; G06T 7/20;
(Continued)

(56) References Cited

U.S. PATENT DOCUMENTS 8,448,858 B1 * 5/2013 Kundu ................ G07G 3/003
                                                          235/383
10,762,486 B2 * 9/2020 Kinno ................ G06T 1/0007
(Continued)

FOREIGN PATENT DOCUMENTS

JP    2008-538030 A    10/2008
JP    2018-160140 A    10/2018
(Continued)

OTHER PUBLICATIONS

International Search Report for PCT Application No. PCT/JP2021/046952, mailed on Mar. 15, 2022.

*Primary Examiner* — Michael Jared Walker
(74) *Attorney, Agent, or Firm* — Sughrue Mion, PLLC

(57) ABSTRACT

A detection system according to an aspect of the present disclosure includes: at least one memory configured to store instructions; and at least one processor configured to execute the instructions to: acquire a number of one or more products to be registered based on an image in which a customer reads one or more product symbols with a scanner; acquire a number of one or more products registered by the customer; detect discrepancy between the number of the one or more products to be registered and the number of the one or more registered products; and output a detection result.

6 Claims, 11 Drawing Sheets

(58) Field of Classification Search
CPC .......... G06T 2207/30242; G06V 40/28; G06V 20/52; G07G 1/0036; G07G 1/0045; G07G 1/0054; G07G 3/003
See application file for complete search history.

(56) References Cited

U.S. PATENT DOCUMENTS

| | | | |
|---|---|---|---|
| 11,710,114 B2* | 7/2023 | Masuda | G07G 1/0018 705/22 |
| 2006/0243798 A1* | 11/2006 | Kundu | G07G 3/00 235/383 |
| 2012/0051586 A1* | 3/2012 | Wakebe | G06Q 20/204 382/100 |
| 2019/0043201 A1* | 2/2019 | Strong | G06V 10/96 |
| 2019/0108396 A1* | 4/2019 | Dal Mutto | G06V 20/52 |
| 2021/0027062 A1* | 1/2021 | Yamasaki | G06V 10/987 |
| 2021/0272423 A1* | 9/2021 | Gao | G07G 1/0036 |
| 2021/0280027 A1* | 9/2021 | Wen | G08B 13/19608 |

FOREIGN PATENT DOCUMENTS

| | | |
|---|---|---|
| JP | 2020-129335 A | 8/2020 |
| WO | 2020/042966 A1 | 3/2020 |

\* cited by examiner

DETECTION SYSTEM, DETECTION METHOD, AND STORAGE MEDIUM

This application is a National Stage Entry of PCT/JP2021/046952 filed on Dec. 20, 2021, which claims priority from Japanese Patent Application 2021-056682 filed on Mar. 30, 2021, the contents of all of which are incorporated herein by reference, in their entirety.

TECHNICAL FIELD

The present disclosure relates to registration of a product.

BACKGROUND ART

In stores such as supermarkets, there are widespread cash register terminals that customers themselves perform scan registration of products to purchase. On the other hand, in such cash register terminals, there has occurred a fraudulent act in which a customer takes out a part of purchasing products without performing scan registration. PTL 1 discloses a technique for detecting a fraudulent act of a store clerk who does not scan to register some products.

CITATION LIST

Patent Literature

PTL 1: JP 2008-538030 A

SUMMARY OF INVENTION

Technical Problem

The technique of PTL 1 is detection of a fraudulent act by a store clerk, and does not detect discrepancy in the numbers of products before and after product registration by a customer.

One object of the present disclosure is to provide a technique for detecting discrepancy in the numbers of products before and after product registration by a customer.

Solution to Problem

A detection system according to one aspect of the present disclosure includes a first acquisition unit that acquires a number of one or more products to be registered based on an image in which a customer reads one or more product symbols with a scanner, a second acquisition unit that acquires a number of one or more products registered by the customer, a detection unit that detects discrepancy between the number of the one or more products to be registered and the number of the one or more registered products, and an output unit that outputs a detection result.

A detection method according to an aspect of the present disclosure includes acquiring a number of one or more products to be registered based on an image that the customer reads one or more product symbols with a scanner, acquiring a number of one or more products registered by the customer, detecting discrepancy between the number of the one or more products to be registered and the number of the one or more registered products, and outputting a detection result.

A program according to an aspect of the present disclosure causes a computer to execute processes including acquiring a number of one or more products to be registered based on an image that the customer reads one or more product symbols with a scanner, acquiring a number of one or more products registered by the customer, detecting discrepancy between the number of the one or more products to be registered and the number of the one or more registered products, and outputting a detection result. The program may be stored in a non-transitory computer-readable recording medium.

Advantageous Effects of Invention

According to the present disclosure, it is possible to detect discrepancy in the numbers of products before and after product registration by a customer.

EXAMPLE EMBODIMENT

First Example Embodiment

A detection system according to an aspect of the first example embodiment will be described with reference to the drawings. The detection system according to the first example embodiment detects discrepancy between the number of products supposed to be registered as products by the customer and the number of registered products, and outputs a detection result.

Figure 1:
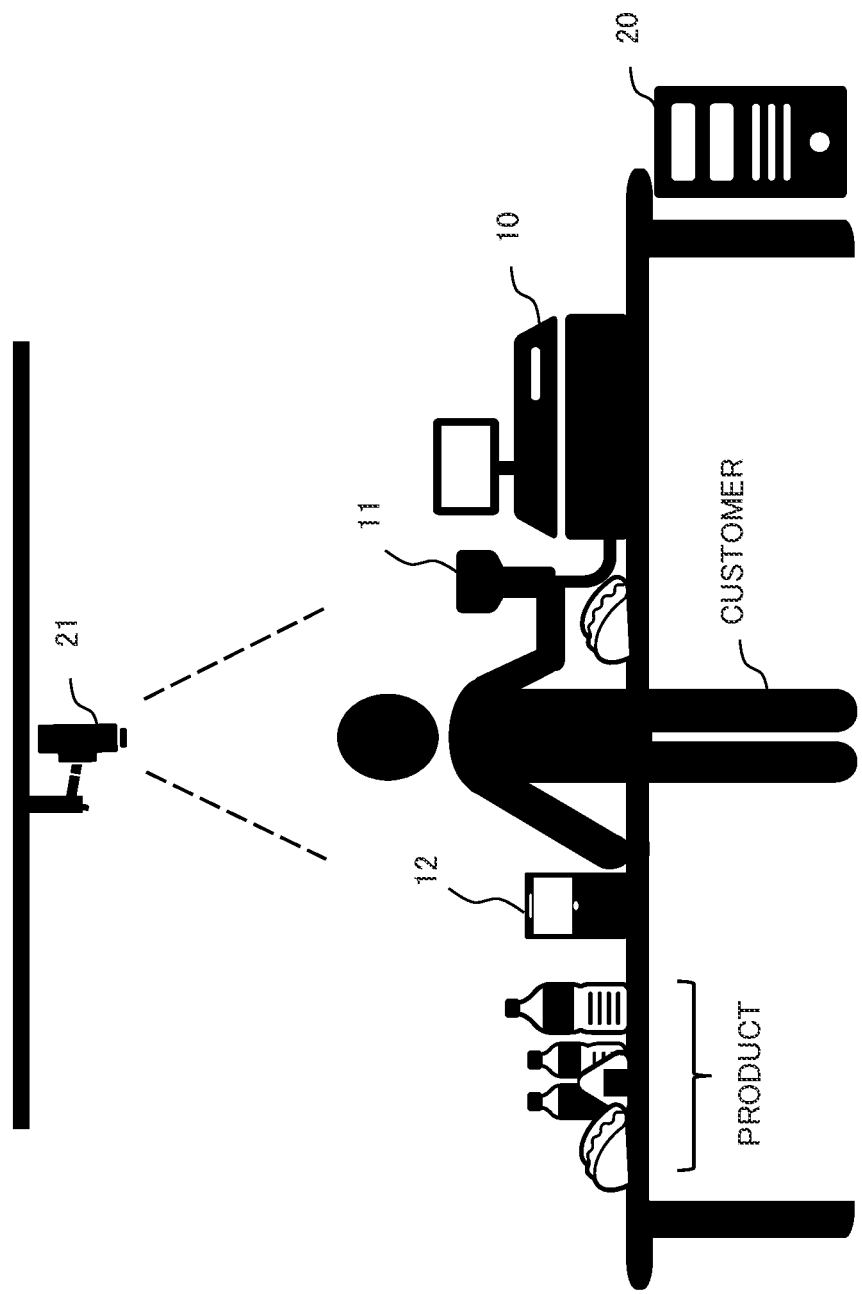
FIG. 1 is a diagram illustrating a state where a customer is registering products.

First, an outline of the detection system will be described. FIG. 1 is a diagram illustrating a state where a customer is registering products. In FIG. 1, the customer uses a handy scanner 11 or a fixed scanner 12 (sometimes simply referred to as a scanner) to scan a product symbol attached to a product for product registration, and registers the product as a checkout target in a product registration device 10. The product registration device 10 transmits the number of products registered by the customer to a detection system 20.

A camera 21 is installed, for example, above a scan area. The scan area is an area where the customer scans the product symbols of the products using the scanner. The camera 21 captures an image of a motion (product scanning motion) in which a customer uses the scanner to read product symbols, and transmits the captured image to the detection system 20. The detection system 20 acquires the number of products to be registered as products by the customer based on the image from camera 21. The detection system 20 detects discrepancy between the number of products to be registered by the customer and the number of registered products, and outputs a detection result.

Figure 2:
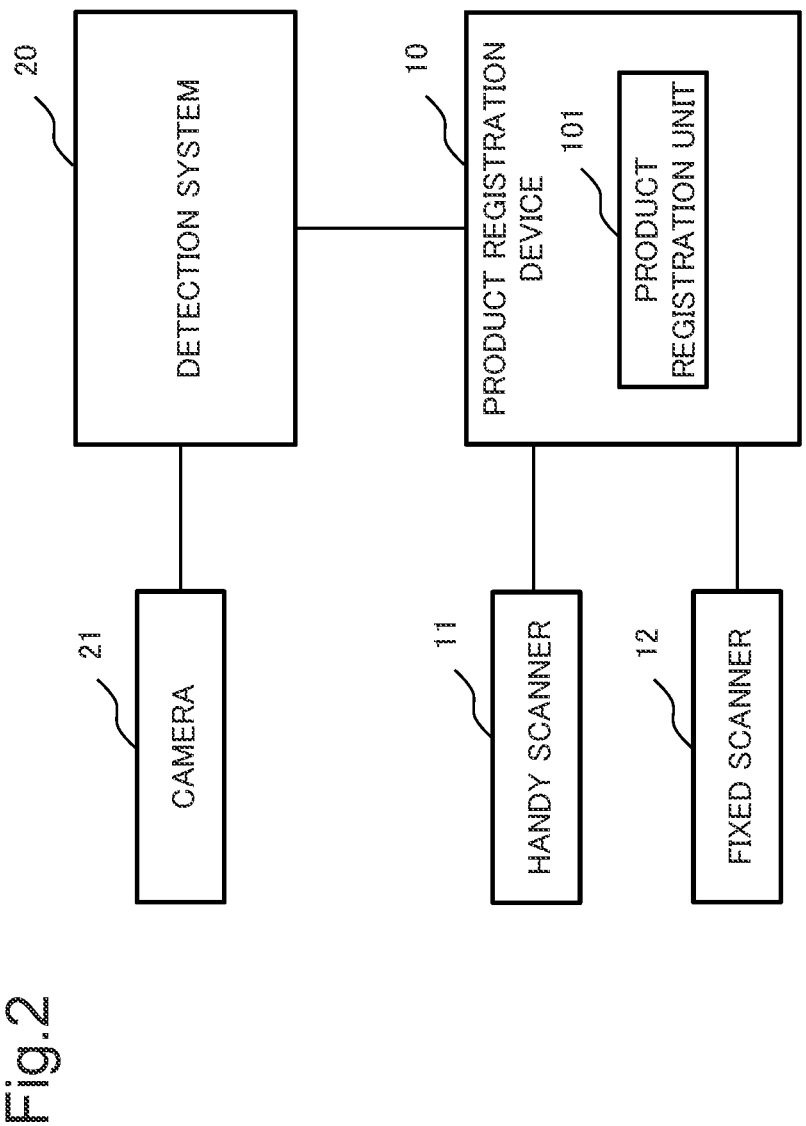
FIG. 2 is a diagram illustrating an outline of a detection system and a product registration device according to a first example embodiment.

The product registration device 10 and the detection system 20 according to the first example embodiment will be described. FIG. 2 is a diagram illustrating an outline of the product registration device 10 and the detection system 20 according to the first example embodiment. The product registration device 10 is connected to the scanners (the handy scanner 11 and the fixed scanner 12). The scanner to be connected to the product registration device 10 may be at least one of the handy scanner 11 and the fixed scanner 12.

When the product symbol (for example, a product code) of a product is placed close to the scanner, the scanner reads the product symbol (for example, the product code). The product symbol may be, for example, a bar code, a two-dimensional code, or a character symbol. The character symbol includes information for specifying product information. The scanner is, for example, a barcode reader. The scanner may be an image sensor type, a laser type, or the like. The description of the scanner is an example, and does not set any limitation. The scanner transmits a product identifier obtained by decoding the read product symbol to the product registration device 10.

The product registration device 10 illustrated in FIG. 2 includes a product registration unit 101. The product registration device 10 is, for example, a product registration device included in a self-checkout system. Upon receiving the product identifier from the scanner, the product registration device 10 searches product information in a product database (not illustrated) using the product identifier, extracts a product name and a product unit price associated with the product identifier, generates product registration information, and executes the product registration.

The product registration information is, for example, a product number, a product name, a unit price, a quantity, a subtotal amount, a total quantity, and a total amount. The product number is a number assigned to each different product in one transaction. The quantity is the number of registered products of the same product. The total quantity is the sum of quantities for each product. When another product identifier is received and its product name and product unit price are extracted, the product registration unit 101 increments the number to generate and update the product registration information. When the same product identifier is received, the product registration unit 101 increments the quantity of the same product name to generate and update the product registration information. For example, when the customer presses a checkout button (not illustrated) of the product registration device 10 as a completion of the product registration, the product registration device 10 transmits the number of registered products to the detection system 20.

Next, the detection system 20 and the camera 21 according to the first example embodiment will be described. The detection system 20 is communicably connected to the camera 21. The camera 21 is installed, for example, above the scan area. The scan area is an area where the customer scans the product symbols of the products using the scanner. The camera 21 captures an image of the product scanning motion by the customer in the scan area. The camera 21 transmits the captured image to the detection system 20.

Figure 3:
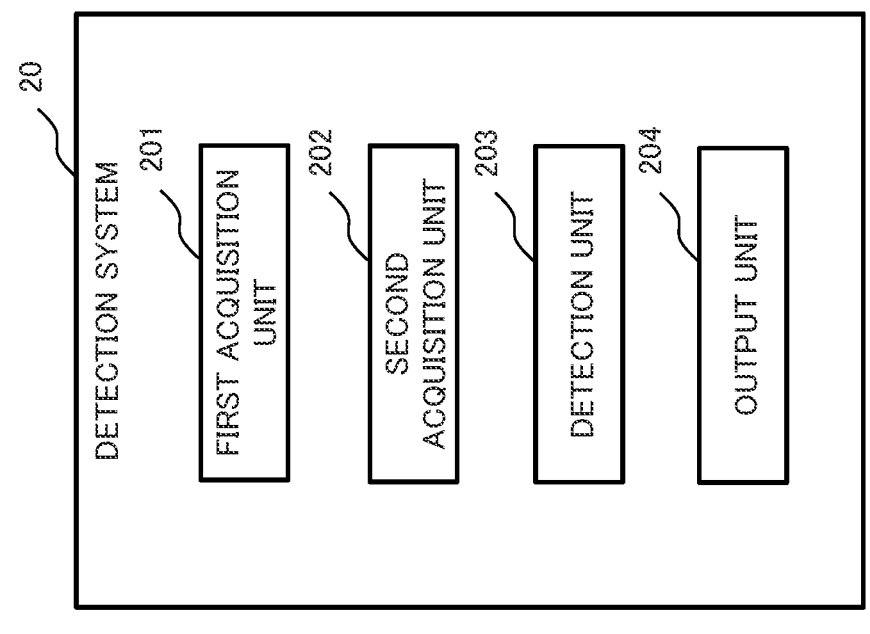
FIG. 3 is a block diagram illustrating an example of a configuration of the detection system according to the first example embodiment.

FIG. 3 is a block diagram illustrating an example of a configuration of the detection system according to the first example embodiment. The detection system 20 illustrated in FIG. 3 includes a first acquisition unit 201, a second acquisition unit 202, a detection unit 203, and an output unit 204.

The first acquisition unit 201 acquires the number of products to be registered by the customer. For example, the first acquisition unit 201 acquires the number of products to be registered based on the image in which the customer scans the product symbols with the handy scanner 11. Hereinafter, an example in which the customer scans the product symbols with the handy scanner 11 will be described.

Figure 4:
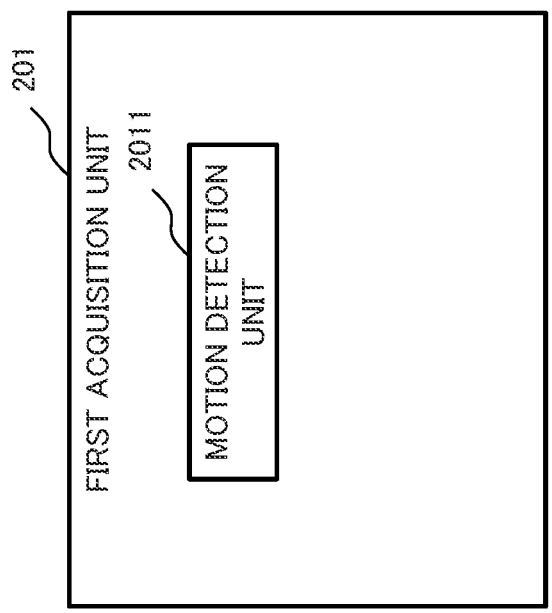
FIG. 4 is a block diagram illustrating an example of a configuration of a first acquisition unit.

Specifically, the first acquisition unit 201 performs image analysis on the image received from the camera 21, and detects a motion (product scanning motion) in which the customer uses the scanner (the handy scanner 11) to read the product symbols. FIG. 4 is a block diagram illustrating an example of a configuration of the first acquisition unit 201. The first acquisition unit 201 includes a motion detection unit 2011. The motion detection unit 2011 performs image processing on the image of the customer by a posture estimation model, and detects a left arm frame and a right arm frame associated to the left arm and the right arm of the customer. The posture estimation model is a model that learns human joint points from an image and detects a human posture connecting the joint points in real time from a still image or a moving image.

Figure 5:
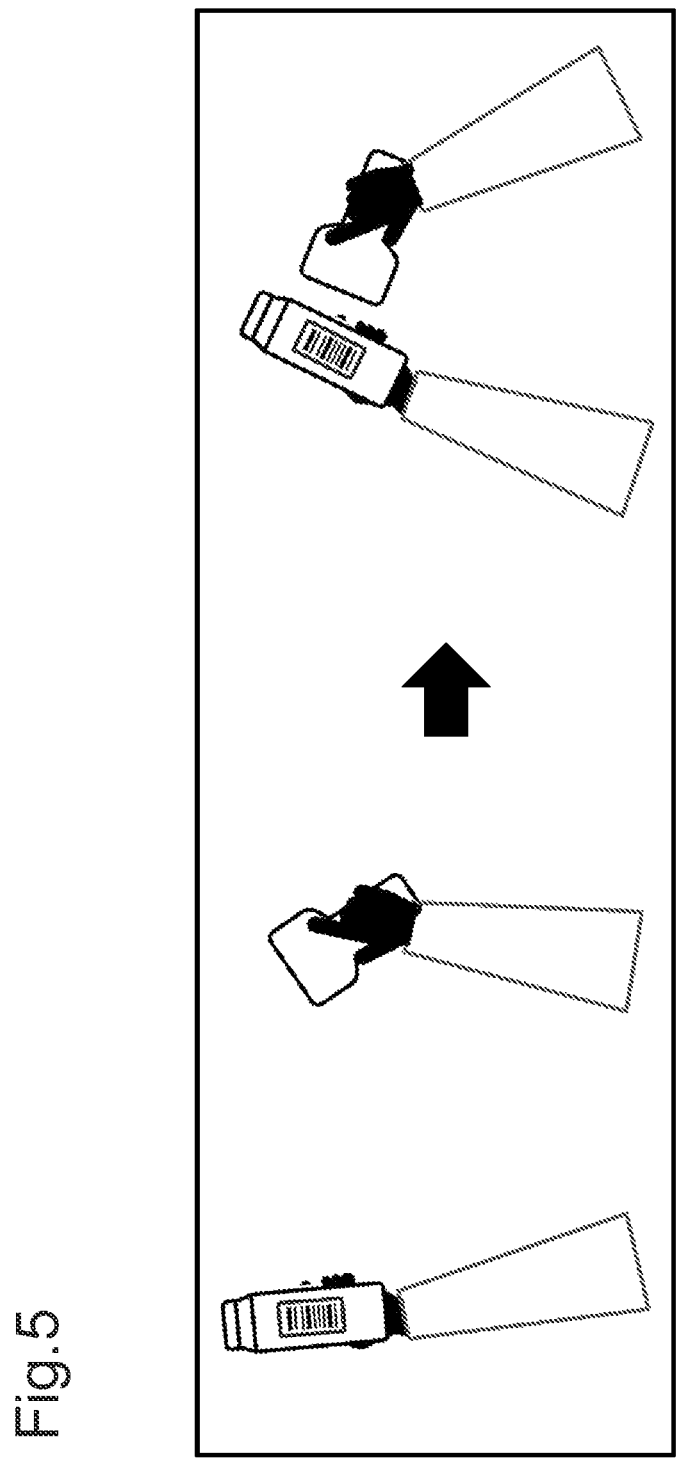
FIG. 5 is a diagram illustrating an example of a product scanning motion by arms in images.

FIG. 5 is a diagram illustrating an example of a product scanning motion by the arms in images. In FIG. 5, the customer holds a product on the left hand and holds the handy scanner 11 on the right hand. Then, the customer performs a product scanning motion of reading the barcode of the product on the left hand with the handy scanner 11 on the right hand.

Figure 6:
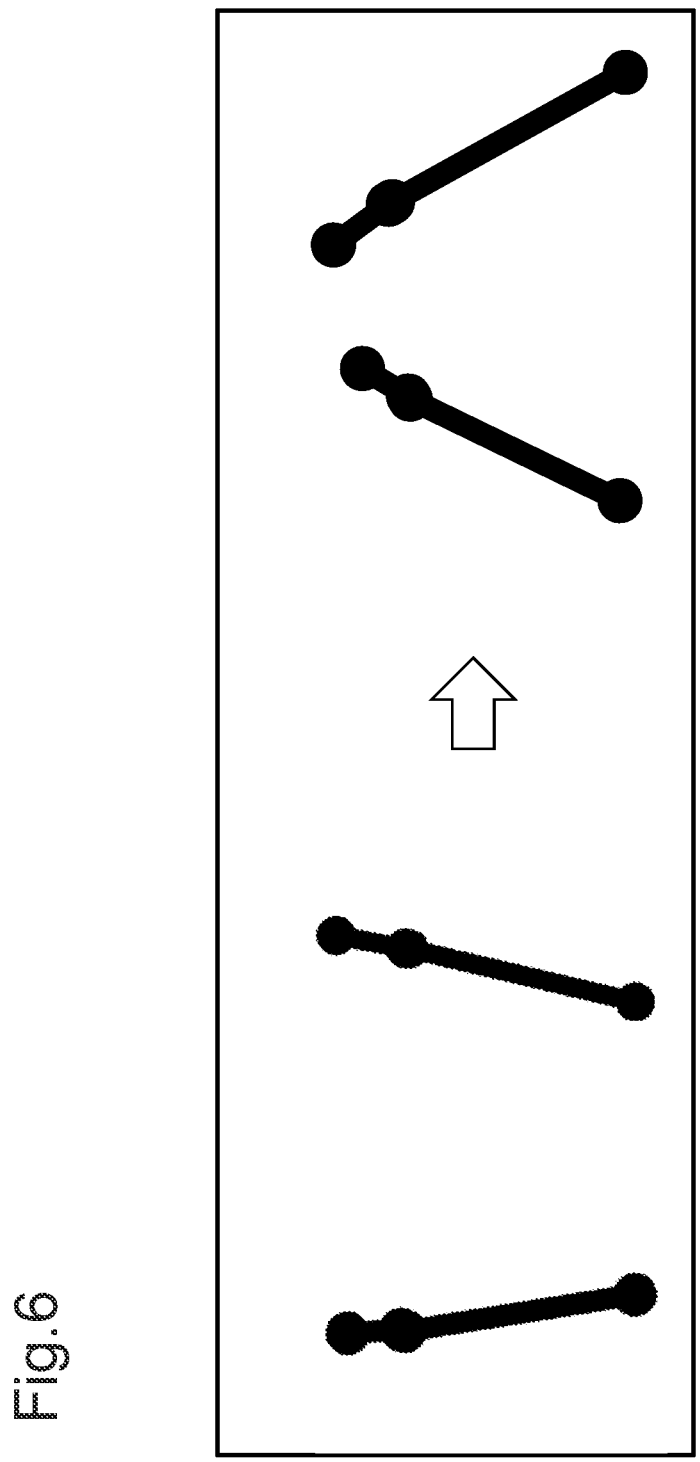
FIG. 6 is a diagram illustrating the product scanning motion of arm frames using a posture estimation model.

FIG. 6 is a diagram illustrating the product scanning motion of arm frames by the posture estimation model. The motion detection unit 2011 detects a motion in which an end of a left arm frame associated to the left arm (for example, the product side) of the customer and an end of a right arm frame associated to the right arm (for example, the handy scanner side) move close to each other as the product scanning motion by the customer. Then, the motion detection unit 2011 counts the number of product scanning motions. The first acquisition unit 201 acquires the counted number of product scanning motion as the number of products to be registered.

Since the handy scanner 11 has a higher degree of freedom than the fixed scanner 12, it is difficult to identify the product scanning motion of the customer by the object recognition in the images. On the other hand, when the motion detection unit 2011 of the first acquisition unit 201 uses the posture estimation model, it is sufficient to detect the proximity of the end of the right arm frame and the end of the left arm frame of the customer, in such a way that the product scanning motion by the customer can be easily identified.

In a case of the fixed scanner 12, the product scanning motion by the customer can also be detected using the posture estimation model in the motion detection unit 2011. For example, in the case of the fixed scanner 12, the customer brings products close to the fixed scanner 12 placed in a predetermined position to read the product symbols. Therefore, by detecting the motion in which the end of the arm frame by the posture estimation model moves close to and then moves away from the position of the fixed scanner in the images of the customer, the motion detection unit 2011 can detect the product scanning motion using the fixed scanner by the posture estimation model.

The second acquisition unit 202 acquires the number of products registered by the customer from the product registration device 10. The second acquisition unit 202 may acquire the number of products registered by the customer from a device other than the product registration device 10. For example, the information may be acquired from a store server or a head office server to which the product registration device 10 has transmitted the product registration information. The second acquisition unit 202 transmits the number of products registered by the customer to the detection unit 203.

The detection unit 203 detects discrepancy between the number of products to be registered by the customer and the number of products registered by the customer. The detection unit 203 may detect, as discrepancy, only a case where the number of registered products is smaller than the number of products to be registered. In this case, for example, in a self-checkout system including the product registration device 10, it is possible to detect a case where a customer has failed to correctly perform scan registration due to a fraudulent act of taking out some purchasing products without scanning and registering, or an error in scanning by the customer, or the like. The detection unit 203 may compare the number of times of the product scanning motion of the customer with the value of the number of products registered as products by the customer, and detect discrepancy in the numbers of products before and after the product registration by the customer.

The detection unit 203 may detect, as discrepancy, only a case where the number of registered products is greater than the number of products to be registered. In this case, it is possible to detect a case where the customer has registered a product that is not planned to be purchased by mistake. According to the present example embodiment, both or at least one of a case where the number of registered products is smaller than the number of products to be registered and a case where the number of registered products is larger than the number of products to be registered is detected. The detection unit 203 transmits the detection result to the output unit 204.

The output unit 204 outputs the detection result. For example, the detection result indicates whether the number of products to be registered by the customer and the number of products registered by the customer match. The output unit 204 may notify an error in the case of discrepancy, and may output, as an example, a message that encourages the customer to start over the product registration or a message that encourages the customer to confirm the content of the product registration. Alternatively, the output unit 204 may output a message indicating that the product registration by the customer is properly completed. Different messages may be output depending on whether the number of registered products is larger or smaller than the number of products to be registered.

When the numbers of products do not match, images including the product scanning motions may be output. The output destination may be, for example, a display device (not illustrated), a store server (not illustrated) in which the product registration device 10 is set, a terminal (not illustrated) used by a clerk of a store in which the product registration device 10 is installed, or a headquarter server that collects product registration information of the product registration device 10.

Figure 7:
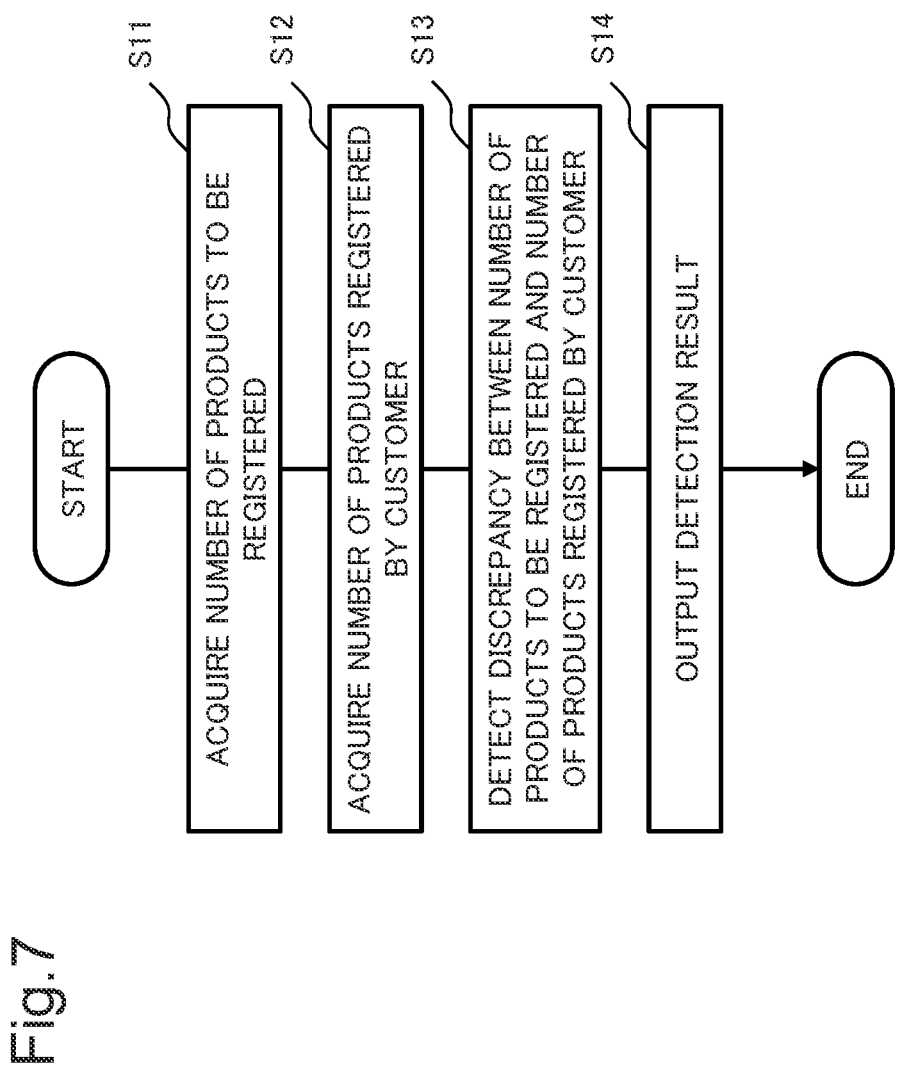
FIG. 7 is a flowchart illustrating an example of the operation of the detection system according to the first example embodiment.

Next, an operation of the detection system according to the first example embodiment will be described. FIG. 7 is a flowchart illustrating an example of the operation of the detection system according to the first example embodiment. In the scan area, the camera 21 captures an image of the customer who scans products, and transmits the captured image to the detection system 20.

Figure 8:
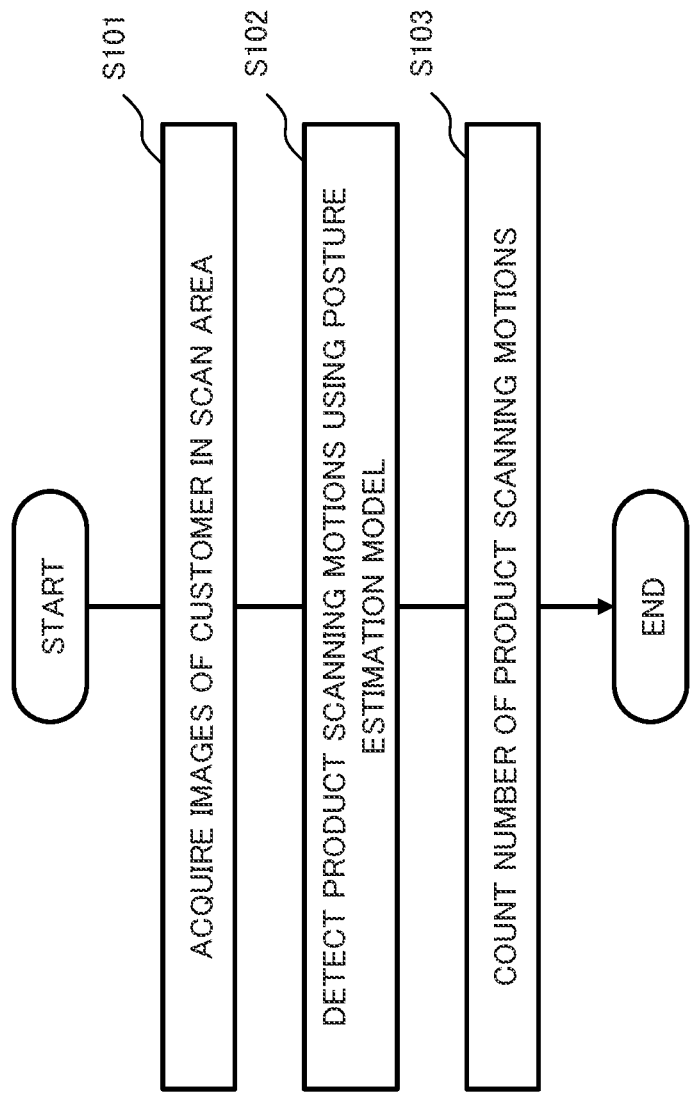
FIG. 8 is a flowchart illustrating an example of an operation of a first processing unit of the first example embodiment.

The first acquisition unit 201 of the detection system 20 acquires the number of products to be registered by the customer based on the image of the customer whose products are to be scanned in the scan area (step S11). The operation of the first acquisition unit 201 will be described in detail. FIG. 8 is a flowchart illustrating an example of the operation of the first acquisition unit. The first acquisition unit 201 acquires the image of the customer in the scan area from the camera 21 (step S101). The motion detection unit 2011 of the first acquisition unit 201 analyzes the image of the customer using the posture estimation model, and detects an action (product scanning motion) in which the customer uses the handy scanner 11 to read the product symbol (step S102).

More specifically, the motion detection unit 2011 detects a motion in which an end of a left arm frame associated to the left arm (for example, the product side) of the customer and an end of a right arm frame associated to the right arm (for example, the handy scanner side) move close to each other as the product scanning motion by the customer. Then, the motion detection unit 2011 counts the number of product scanning motions (step S103). The first acquisition unit 201 sets the counted number of product scanning motions as a number of products to supposed be registered. The acquisition of the number of products to be registered by the first acquisition unit 201 is not limited thereto.

Returning to FIG. 7, the second acquisition unit 202 acquires the number of products registered by the customer (step S12). The second acquisition unit 202 may acquire the number of products registered by the customer from the product registration device 10 or may acquire the number of products from a device other than the product registration device 10. The second acquisition unit 202 transmits the number of products registered by the customer to the detection unit 203.

The detection unit 203 detects discrepancy between the number of products supposed to be registered by the customer and the number of products registered by the customer (step S13). The detection unit 203 transmits the detection result to the output unit 204. The output unit 204 outputs the detection result (step S14). The detection result indicates whether the number of products to be registered by the customer and the number of products registered by the customer match.

Effects of First Example Embodiment

According to the first example embodiment, the discrepancy in the numbers of products before and after the product registration by the customer is detected. The reason is that the first acquisition unit 201 acquires the number of products to be registered based on the image in which the customer reads the product symbols with the scanner, and the second acquisition unit 202 acquires the number of products registered by the customer. This is because the detection unit 203 detects discrepancy between the number of products to be registered and the number of products registered.

Furthermore, since the motion detection unit 2011 of the first acquisition unit 201 detects the product scanning motions using the posture estimation model, the accuracy of identification of the product scanning motions is improved.

Second Example Embodiment

A configuration of a detection system according to a second example embodiment will be described. A configuration of a detection system 20 according to the second example embodiment includes a first acquisition unit 201, a second acquisition unit 202, a detection unit 203, and an output unit 204. However, the function of the first acquisition unit 201 according to the second example embodiment is different from that of the first acquisition unit 201 of the first example embodiment.

The detection system 20 according to the second example embodiment is related to a case where a customer registers products using each of the handy scanner 11 and the fixed scanner 12. For example, there is a case where there is a product in a size or weight that is difficult to read by the fixed scanner 12 among a plurality of products to be registered by a customer using the fixed scanner 12, and such a product is scanned by the handy scanner 11 instead of the fixed scanner 12.

Hereinafter, differences between the second example embodiment and the first example embodiment will be described, and similar configurations and operations will not be described.

In the second example embodiment, the camera 21 captures an image of the product scanning motions of the customer using the handy scanner 11 and the fixed scanner 12 in the scanning area. The camera 21 transmits the captured image to the detection system 20.

The detection system 20 receives the image from the camera 21. The first acquisition unit 201 of the detection system 20 acquires the number of products to be registered based on the image of the products scanned by the customer using the handy scanner 11 and the fixed scanner 12.

Specifically, the motion detection unit 2011 of the first acquisition unit 201 illustrated in FIG. 4 performs image analysis on the image received from the camera 21, and detects the product scanning motions with the handy scanner 11 and the product scanning motions with the fixed scanner 12. The motion detection unit 2011 counts and sums the number of times of product scanning motions with the handy scanner 11 and the fixed scanner 12. The first acquisition unit 201 acquires the total number of times of the product scanning motions of each of the handy scanner 11 and the fixed scanner 12 as the number of products to be registered. The first acquisition unit 201 transmits the number of products to be registered to the detection unit 203.

The second acquisition unit 202 acquires the number of products registered by the customer from the product registration device 10. The second acquisition unit 202 may acquire the number of products registered by the customer from a device other than the product registration device 10. For example, the information may be acquired from a store server or a head office server to which the product registration device 10 has transmitted the product registration information. The second acquisition unit 202 transmits the number of products registered by the customer to the detection unit 203. The detection unit 203 detects discrepancy between the number of products to be registered by the customer and the number of products registered by the customer. The output unit 204 outputs the detection result.

An operation of the detection system 20 according to the second example embodiment will be described. In the operation of detection system 20 according to the second example embodiment, the operation of first acquisition unit 201 is different from the operation of detection system 20 according to the first example embodiment.

Figure 9:
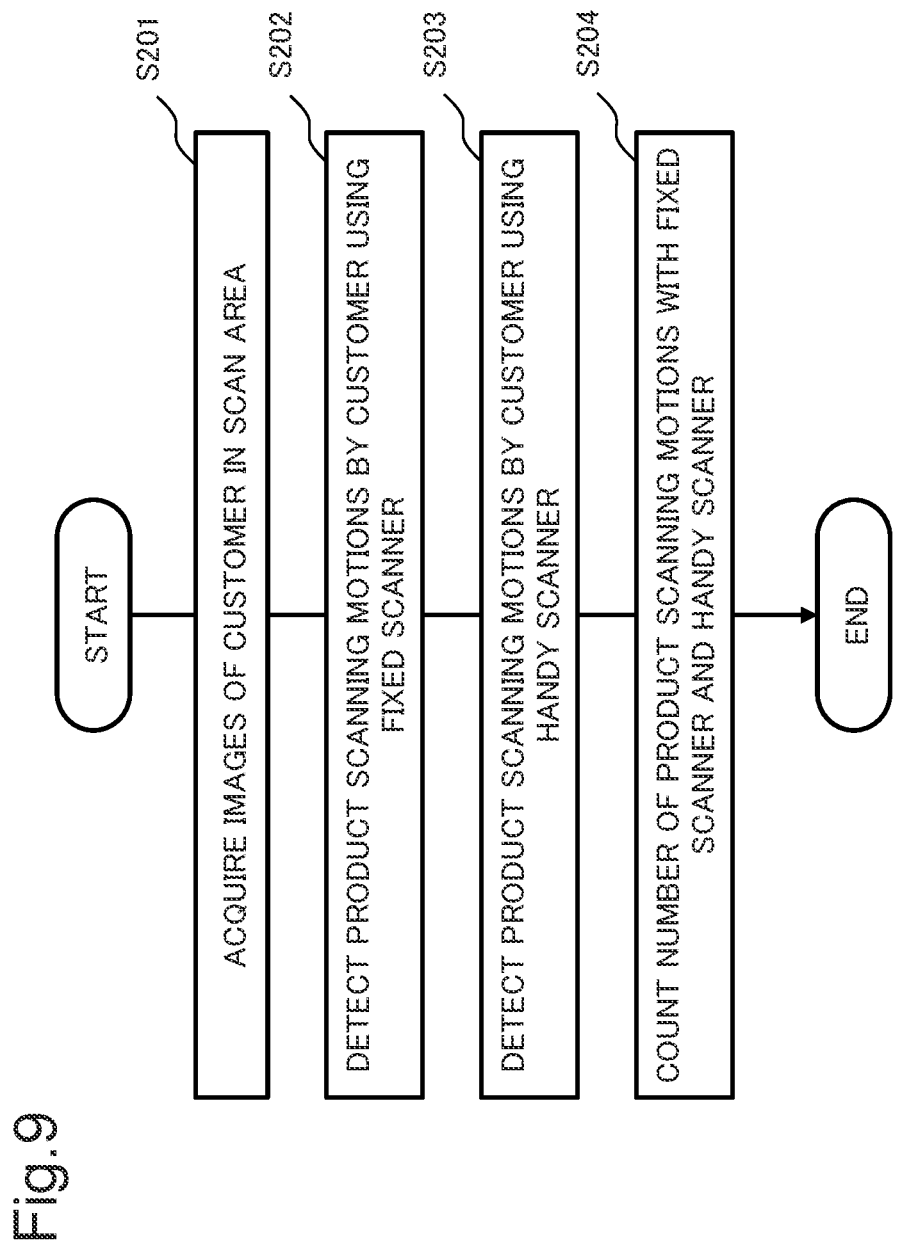
FIG. 9 is a flowchart illustrating an example of an operation of a first processing unit of a second example embodiment.

FIG. 9 is a flowchart illustrating an example of the operation of the first acquisition unit 201 according to the second example embodiment. In the operation illustrated in FIG. 9, the first acquisition unit 201 acquires an image obtained by capturing an image of the customer using the handy scanner 11 and the fixed scanner 12 in the scan area (step S201). The motion detection unit 2011 of the first acquisition unit 201 detects, in the image, the product scanning motions of the customer using the fixed scanner 12 (step S202). Further, the motion detection unit 2011 detects, in the same image, the product scanning motions of the customer using the handy scanner 11 (step S203). The motion detection unit 2011 counts the number of times of the product scanning motions with the handy scanner 11 and the fixed scanner 12 (step S204) and adds up the numbers. The first acquisition unit 201 acquires the total number of times of the product scanning motions of each of the handy scanner 11 and the fixed scanner 12 as the number of products to be registered. The first acquisition unit 201 transmits the number of products to be registered to the detection unit 203. The subsequent steps are similar to the steps S12, S13, and S14 of the operation of detection system 20 illustrated in FIG. 7.

Effects of Second Example Embodiment

According to the second example embodiment, even in a case where the customer registers the products using the handy scanner 11 and the fixed scanner 12, the detection system 20 can acquire the number of products to be registered.

This is because the motion detection unit 2011 of the first acquisition unit 201 detects the product scanning motions by each of the handy scanner 11 and the fixed scanner 12 based on the image obtained by photographing the customer in the scan area.

Third Example Embodiment

Next, a configuration of a detection system according to a third example embodiment will be described. A configuration of a detection system 20 according to the third example embodiment includes a first acquisition unit 201, a second acquisition unit 202, a detection unit 203, and an output unit 204. Note that the function of the first acquisition unit 201 of the third example embodiment is different from that of the first acquisition unit 201 of the first and second example embodiments.

The detection system 20 according to the third example embodiment is an example of correcting the number of times of the product scanning motions by the customer using the number of products included in the image captured before the customer registers the products.

In the following description, differences of the third example embodiment from the first and second example embodiments will be described, and description of similar configurations and operations will be omitted.

In the third example embodiment, the camera 21 captures an image of products before product registration by the customer in the scan area, and transmits the captured image to the detection system 20. Further, the camera 21 captures an image of the customer who scans the products in the scan area, and transmits the captured image to the detection system 20.

The first acquisition unit 201 of the detection system 20 acquires the image of the products before the product registration by the customer from the camera 21. The first acquisition unit 201 further acquires the image of the customer who scans the product is in the scan area. The first acquisition unit 201 detects the number of products before product registration based on the image of the products before product registration. Specifically, the first acquisition unit 201 detects the number of products by performing image analysis on the image of the products before the product registration.

Further, the first acquisition unit 201 acquires the number of products to be registered based on the image of the customer who scans the products. Specifically, the motion detection unit 2011 of the first acquisition unit 201 performs image analysis on the image received from the camera 21, and detects the product scanning motions by the customer. The motion detection unit 2011 counts the number of times of the product scanning motions of the customer. The first acquisition unit 201 acquires the number of times of the product scanning motion by the customer as the number of products to be registered. The first acquisition unit 201 transmits the number of products to be registered to the detection unit 203.

The second acquisition unit 202 acquires the number of products registered by the customer from the product registration device 10. The second acquisition unit 202 may acquire the number of products registered by the customer from a device other than the product registration device 10. For example, the information may be acquired from a store server or a head office server to which the product registration device 10 has transmitted the product registration information. The second acquisition unit 202 transmits the number of products registered by the customer to the detection unit 203. The detection unit 203 detects discrepancy between the number of products to be registered by the customer and the number of products registered by the customer. The output unit 204 outputs the detection result.

Figure 10:
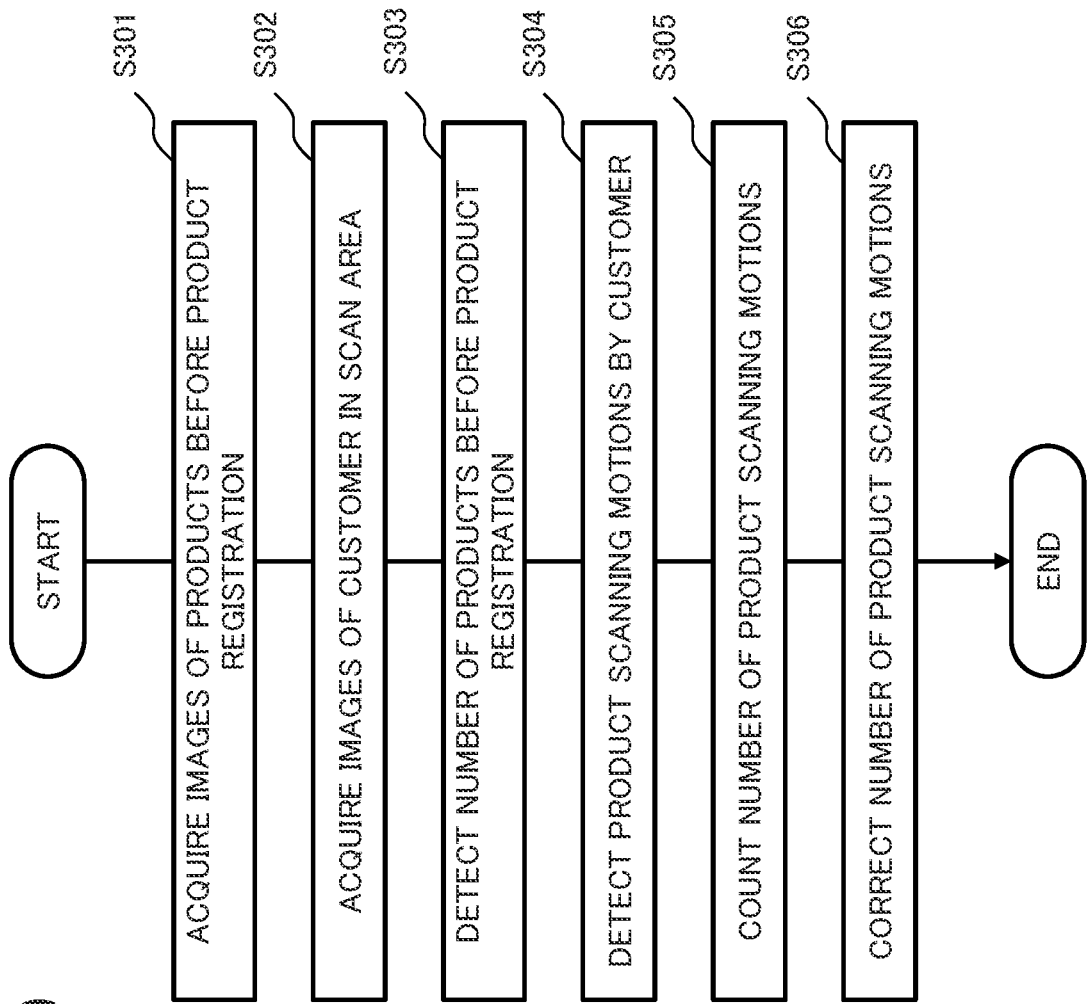
FIG. 10 is a flowchart illustrating an example of an operation of a first processing unit of the third example embodiment.

An operation of the detection system 20 according to the third example embodiment will be described. The operation of the first acquisition unit 201 of the third example embodiment is different from the operation of the first acquisition unit 201 of the first example embodiment. FIG. 10 is a flowchart illustrating an example of the operation of the first acquisition unit 201 according to the third example embodiment. In the third example embodiment, the camera 21 captures an image of products before product registration by the customer in the scan area, and transmits the captured image to the detection system 20. Further, the camera 21 captures an image of the customer who scans the products in the scan area, and transmits the captured image to the detection system 20.

The first acquisition unit of the detection system 20 acquires the image of the products before the product registration by the customer from the camera 21 (step S301). Further, the first acquisition unit 201 acquires the image of the customer who scans the products in the scan area from the camera 21 (step S302). The first acquisition unit 201 detects the number of products before product registration based on the image of the products before product registration (step S303). Specifically, the first acquisition unit 201 detects the number of products by performing image analysis on the image of the products before the product registration.

Further, the first acquisition unit 201 acquires the number of products to be registered based on the image of the customer who scans the products. Specifically, the motion detection unit 2011 of the first acquisition unit 201 performs image analysis on the image received from the camera 21, and detects the product scanning motions by the customer (step S304). The motion detection unit 2011 counts the number of times of the product scanning motions of the customer (step S305).

For example, in a case where the number of products before product registration is larger than the number of detected product scanning motions at the end of product registration, there is a possibility that an error has occurred in the product scanning motions or the counting of the product scanning motions. Therefore, the motion detection unit 2011 corrects the number of product scanning motions with the number of products before product registration (step S306). In a case where there is correction, the first acquisition unit 201 transmits the corrected number of the product scanning motions to the detection unit 203 as the number of products supposed to be registered. The subsequent steps are similar to the steps S12, S13, and S14 of the operation of detection system 20 illustrated in FIG. 7.

Effects of Third Example Embodiment

According to the third example embodiment, the detection accuracy of the product scanning motions can be improved. This is because the motion detection unit 2011 of the first acquisition unit 201 detects the number of products before product registration based on the image of the customer who scans for the products, and compares the detected number of products with the number of times of the product scanning motions.

Hardware Configuration

Figure 11:
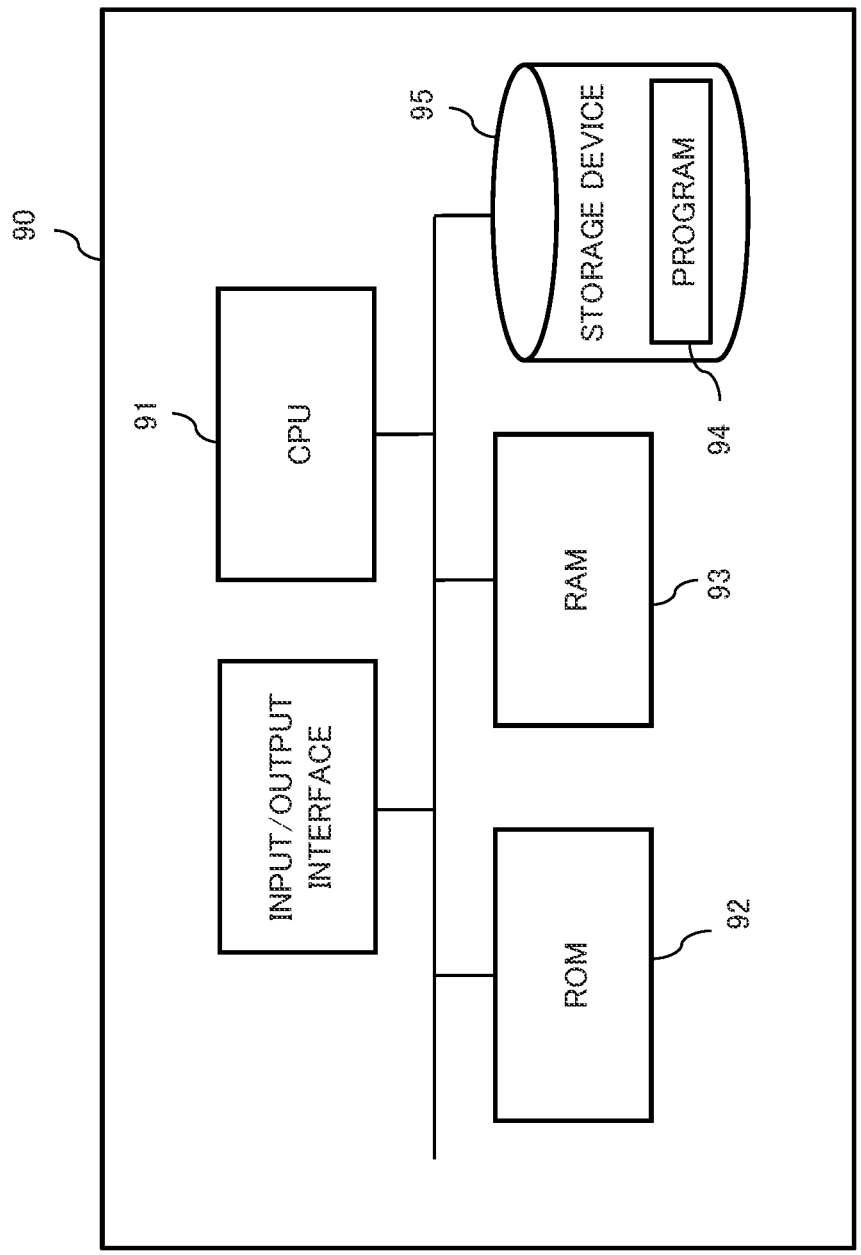
FIG. 11 is a diagram illustrating a hardware configuration of a computer.

FIG. 11 is a diagram illustrating an example of a hardware configuration of a computer. The functions of the first acquisition unit 201, the second acquisition unit 202, the detection unit 203, and the output unit 204 of the detection system 20 are implemented by a central processing unit (CPU) 91 executing a program 94. The function of detection system 20 may be configured by an external device (not illustrated), and provided from the external device to the detection system 20 via a network. In the detection system 20, the CPU 91 may read the program 94 from a read only memory (ROM) 92 or a storage device 95, and the program may be executed by the CPU 91 or a random access memory (RAM) 93.

The present disclosure described using the above-described example embodiments as an example can be regarded as being configured by a code representing a computer program or a computer readable storage medium storing a code representing the computer program. The computer-readable storage medium is, for example, the storage device 95, a removable magnetic disk medium (not illustrated), an optical disk medium, a memory card, or the like. The configuration of each example embodiment may be dedicated hardware by an integrated circuit. The detection system 20 may be implemented by cloud computing.

The present disclosure is not limited to the above-described example embodiments, and various modifications can be made, and embodiments obtained by appropriately combining configurations, operations, and processes disclosed in different embodiments are also included in the technical scope of the present disclosure.

The present disclosure has been described above using the above-described embodiments as example embodiments. However, the present disclosure is not limited to the above-described example embodiments. In other words, the present disclosure can apply various aspects that can be understood by those skilled in the art within the scope of the present disclosure.

This application is based upon and claims the benefit of priority from Japanese Patent Application No. 2021-056682 filed on Mar. 30, 2021, the disclosure of which is incorporated herein in its entirety by reference.

Some or all of the above example embodiments can be described as the following supplementary notes, but are not limited to the following.

Supplementary Note

Supplementary Note 1

A detection system including:
a first acquisition means configured to acquire a number of one or more products to be registered based on an image in which a customer reads one or more product symbols with a scanner;
a second acquisition means configured to acquire a number of one or more products registered by the customer;
a detection means configured to detect discrepancy between the number of the one or more products to be registered and the number of the one or more registered products; and
an output means configured to output a detection result.

Supplementary Note 2

The detection system according to supplementary note 1, wherein the number of the one or more products to be registered is a number of times of the product scanning motion that the customer reads the one or more product symbols with the scanner.

Supplementary Note 3

The detection system according to supplementary note 1 or 2, wherein
the first acquisition means includes a motion detection means configured to detect, by analyzing the image, a product scanning motion that the customer reads the one or more product symbols with the scanner, and
the first acquisition means acquires a number of times of the product scanning motion by the customer as the number of the one or more products to be registered.

Supplementary Note 4

The detection system according to supplementary note 3, wherein the motion detection means detects, using a posture estimation model, the product scanning motion by the customer in the image.

Supplementary Note 5

The detection system according to supplementary note 4, wherein the motion detection means detects, using the posture estimation model, the product scanning motion by the customer with a handy scanner.

Supplementary Note 6

The detection system according to supplementary note 4, wherein the motion detection means detects, using the posture estimation model, a motion that an end of a left arm frame associated to customer's left arm and an end of a right arm frame associated to customer's right arm approach each other as the product scanning motion by the customer.

Supplementary Note 7

The detection system according to supplementary note 3, wherein
the motion detection means detects a first product scanning motion with the handy scanner and a second product scanning motion with a fixed scanner based on the image that the customer reads the one or more product symbols using the handy scanner and the fixed scanner, and
the first acquisition means acquires a sum of the number of times of the first product scanning motion and the number of times of the second product scanning motion as the number of the one or more products to be registered.

Supplementary Note 8

The detection system according to supplementary note 3, wherein
the first acquisition means detects the number of one or more products before product registration based on an image of the one or more products before product registration, and
the motion detection means corrects the number of times of the product scanning motion by the customer based on the detected number of products before product registration.

Supplementary Note 9

A detection method including:
acquiring a number of one or more products to be registered based on an image that the customer reads one or more product symbols with a scanner;
acquiring a number of one or more products registered by the customer;
detecting discrepancy between the number of the one or more products to be registered and the number of the one or more registered products, and
outputting a detection result.

Supplementary Note 10

A storage medium that non-temporarily stores a program that causes a computer to perform processes including:
acquiring a number of one or more products to be registered based on an image that the customer reads one or more product symbols with a scanner;
acquiring a number of one or more products registered by the customer;
detecting discrepancy between the number of the one or more products to be registered and the number of the one or more registered products, and
outputting a detection result.

REFERENCE SIGNS LIST 10 product registration device
11 handy scanner
12 fixed scanner
20 detection system 21 camera
201 first acquisition unit
202 second acquisition unit
203 detection unit
204 output unit

What is claimed is:

1. A detection system comprising:
at least one memory configured to store instructions; and
at least one processor configured to execute the instructions to:
acquire a number of one or more products to be registered based on an image in which a customer reads one or more product symbols with a scanner;
acquire a number of one or more products registered by the customer;
detect discrepancy between the number of the one or more products to be registered and the number of the one or more registered products; and
output a detection result comprising a message that encourages the customer to start over a product registration or a message that encourages the customer to confirm a content of the product registration,
wherein the number of the one or more products to be registered is a number of times of a product scanning motion that the customer reads the one or more product symbols with the scanner,
wherein the at least one processor is further configured to execute the instructions to:
detect, by analyzing the image using a posture estimation model, the product scanning motion that the customer reads the one or more product symbols with the scanner, wherein analyzing the image comprises:
recognize human joint points from the image using a model trained to recognize human joint points from images;
detect a right arm frame and a left arm frame of the customer from the human joint points;
acquire a number of times of the product scanning motion by the customer based on movements of the right arm frame and the left arm frame as the number of one or more products to be registered;
detect the number of one or more products before product registration based on an image of the one or more products before the product registration;
correct the number of times of the product scanning motion by the customer based on the detected number of one or more products detected from the images before the product registration; and
detect a discrepancy between the corrected number and the number of registered products.

2. The detection system according to claim 1, wherein the at least one processor is further configured to execute the instructions to:
detect, using the posture estimation model, the product scanning motion by the customer with a handy scanner.

3. The detection system according to claim 1, wherein the at least one processor is further configured to execute the instructions to:
detect, using the posture estimation model, a motion that an end of the left arm frame associated to the customer's left arm and an end of the right arm frame associated to the customer's right arm approach each other as the product scanning motion by the customer.

4. The detection system according to claim 1, wherein the at least one processor is further configured to execute the instructions to:
detect a first product scanning motion with a handy scanner and a second product scanning motion with a fixed scanner based on the image that the customer reads the one or more product symbols using the handy scanner and the fixed scanner, and
acquire a sum of the number of times of the first product scanning motion and the number of times of the second product scanning motion as the number of the one or more products to be registered.

5. A detection method comprising:
acquiring a number of one or more products to be registered based on an image that the customer reads one or more product symbols with a scanner;
acquiring a number of one or more products registered by the customer;
detecting discrepancy between the number of the one or more products to be registered and the number of the one or more registered products; and
outputting a detection result comprising a message that encourages the customer to start over a product registration or a message that encourages the customer to confirm a content of the product registration,
wherein the number of the one or more products to be registered is a number of times of a product scanning motion that the customer reads the one or more product symbols with the scanner,
wherein the detection method further comprises:
detecting, by analyzing the image using a posture estimation model, the product scanning motion
that the customer reads the one or more product symbols with the scanner, wherein analyzing the image comprises:
recognizing human joint points from the image using a model trained to recognize human joint points from images;
detecting a right arm frame and a left arm frame of the customer from the human joint points;
acquiring a number of times of the product scanning motion by the customer based on movements of the right arm frame and the left arm frame as the number of one or more products to be registered;
detecting the number of one or more products before product registration based on an image of the one or more products before the product registration;
correcting the number of times of the product scanning motion by the customer based on the detected number of one or more products detected from the images before the product registration; and
detecting a discrepancy between the corrected number and the number of registered products.

6. A non-transitory computer-readable storage medium that non-temporarily stores a program that causes a computer to perform processes comprising:
acquiring a number of one or more products to be registered based on an image that the customer reads one or more product symbols with a scanner;
acquiring a number of one or more products registered by the customer;
detecting discrepancy between the number of the one or more products to be registered and the number of the one or more registered products; and
outputting a detection result comprising a message that encourages the customer to start over a product registration or a message that encourages the customer to confirm a content of the product registration,
wherein the number of the one or more products to be registered is a number of times of a product scanning motion that the customer reads the one or more product symbols with the scanner,
wherein the processing further comprises:
  detecting, by analyzing the image using a posture estimation model, the product scanning motion that the customer reads the one or more product symbols with the scanner, wherein analyzing the image comprises:
  recognizing human joint points from the image using a model trained to recognize human joint points from images;
  detecting a right arm frame and a left arm frame of the customer from the human joint points;
  acquiring a number of times of the product scanning motion by the customer based on movements of the right arm frame and the left arm frame as the number of one or more products to be registered;
  detecting the number of one or more products before product registration based on an image of the one or more products before the product registration;
  correcting the number of times of the product scanning motion by the customer based on the detected number of one or more products detected from the images before the product registration; and
  detecting a discrepancy between the corrected number and the number of registered products.

* * * * *